US007961856B2

(12) United States Patent
Zellner

(10) Patent No.: US 7,961,856 B2
(45) Date of Patent: Jun. 14, 2011

(54) METHODS, SYSTEMS, AND PRODUCTS FOR PROCESSING RESPONSES IN PROMPTING SYSTEMS

(75) Inventor: Samuel N. Zellner, Dunwoody, GA (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 1281 days.

(21) Appl. No.: 11/378,460

(22) Filed: Mar. 17, 2006

(65) Prior Publication Data
US 2007/0263800 A1 Nov. 15, 2007

(51) Int. Cl.
*H04M 11/00* (2006.01)
(52) U.S. Cl. .............................. 379/100.15; 379/265.09
(58) Field of Classification Search .... 379/88.01–88.25, 379/52, 114.13, 100.13–100.15, 265.09; 709/206–207
See application file for complete search history.

(56) References Cited

U.S. PATENT DOCUMENTS

| 4,142,067 | A | 2/1979 | Williamson |
| 4,788,715 | A | 11/1988 | Lee |
| 5,309,505 | A | 5/1994 | Szlam et al. |
| 5,455,853 | A | 10/1995 | Cebulka et al. |
| 5,553,121 | A | 9/1996 | Martin et al. |
| 5,867,572 | A | 2/1999 | MacDonald |
| 5,872,834 | A | 2/1999 | Teitelbaum |
| 6,016,336 | A | 1/2000 | Hanson |
| 6,044,382 | A | 3/2000 | Martino |
| 6,064,730 | A | 5/2000 | Ginsberg |
| 6,104,790 | A | 8/2000 | Narayanaswami |
| 6,112,172 | A | 8/2000 | True et al. |
| 6,122,346 | A | 9/2000 | Grossman |
| 6,240,448 | B1 | 5/2001 | Imielinski et al. |
| 6,243,684 | B1 | 6/2001 | Stuart et al. |
| 6,370,238 | B1 | 4/2002 | Sansone et al. |
| 6,421,672 | B1 | 7/2002 | McAllister et al. |
| 6,456,619 | B1 | 9/2002 | Sassin et al. |
| 6,487,277 | B2 | 11/2002 | Beyda et al. |
| 6,510,434 | B1 | 1/2003 | Anderson et al. |
| 6,665,644 | B1 | 12/2003 | Kanevsky et al. |
| 6,690,776 | B1 | 2/2004 | Raasch |
| 6,714,643 | B1 | 3/2004 | Gargeya |
| 6,718,017 | B1 | 4/2004 | Price et al. |
| 6,738,473 | B1 | 5/2004 | Burg |
| 6,775,264 | B1 | 8/2004 | Kurganov |
| 6,798,877 | B2 | 9/2004 | Johnson |
| 6,801,620 | B2 | 10/2004 | Smith |
| 6,820,260 | B1 | 11/2004 | Flockhart |
| 6,842,767 | B1 | 1/2005 | Partovi |
| 6,853,966 | B2 | 2/2005 | Bushey |
| 6,885,733 | B2 | 4/2005 | Pearson et al. |
| 6,922,466 | B1 | 7/2005 | Peterson et al. |
| 6,944,592 | B1 | 9/2005 | Pickering |

(Continued)

FOREIGN PATENT DOCUMENTS
WO  WO 2004040889  5/2004

*Primary Examiner* — Simon Sing
*Assistant Examiner* — Assad Mohammed
(74) *Attorney, Agent, or Firm* — Scott P. Zimmerman PLLC

(57) ABSTRACT

Methods, systems, and products are disclosed for processing responses in a prompting system. A response is received to a prompt and compared to a set of conditions for interpreting the response. If the response is not interpretable, then an alternative presentation of the prompt is obtained. A supplemental prompt is sent that presents the alternative presentation of the prompt.

17 Claims, 16 Drawing Sheets

U.S. PATENT DOCUMENTS

| | | |
|---|---|---|
| 6,965,664 B1 * | 11/2005 | McIntosh et al. .............. 379/52 |
| 7,023,837 B1 | 4/2006 | Srinivasan |
| 7,043,435 B2 * | 5/2006 | Knott et al. .................. 704/270 |
| 7,050,990 B1 | 5/2006 | Chu et al. |
| 7,257,217 B1 | 8/2007 | Lee |
| 7,295,668 B2 | 11/2007 | Singer |
| 7,386,103 B1 | 6/2008 | Chahal |
| 7,436,948 B1 * | 10/2008 | Thenthiruperai ........ 379/266.03 |
| 2001/0024497 A1 | 9/2001 | Campbell |
| 2003/0005076 A1 | 1/2003 | Koch et al. |
| 2003/0035531 A1 | 2/2003 | Brown et al. |
| 2003/0041314 A1 | 2/2003 | Heeren et al. |
| 2003/0061029 A1 * | 3/2003 | Shaket ............................ 704/9 |
| 2003/0112952 A1 | 6/2003 | Brown |
| 2003/0191648 A1 * | 10/2003 | Knott et al. .................. 704/275 |
| 2003/0195748 A1 | 10/2003 | Schalkwyk |
| 2003/0232640 A1 | 12/2003 | Walker |
| 2004/0006476 A1 | 1/2004 | Chiu |
| 2004/0019646 A1 * | 1/2004 | Zweben et al. .............. 709/206 |
| 2004/0042592 A1 | 3/2004 | Knott |
| 2004/0042593 A1 | 3/2004 | Gulrajani et al. |
| 2004/0120479 A1 | 6/2004 | Creamer et al. |
| 2004/0153322 A1 | 8/2004 | Neuberger et al. |
| 2004/0205731 A1 | 10/2004 | Junkermann |
| 2004/0215757 A1 * | 10/2004 | Butler .......................... 709/223 |
| 2004/0267613 A1 | 12/2004 | Chan et al. |
| 2005/0008141 A1 | 1/2005 | Kortum |
| 2005/0027536 A1 | 2/2005 | Matos |
| 2005/0060304 A1 | 3/2005 | Parikh |
| 2005/0069122 A1 | 3/2005 | Lin |
| 2005/0081152 A1 * | 4/2005 | Commarford et al. ........ 715/705 |
| 2005/0129252 A1 * | 6/2005 | Heintzman et al. ............. 381/58 |
| 2005/0135338 A1 | 6/2005 | Chiu et al. |
| 2005/0137875 A1 | 6/2005 | Kim et al. |
| 2005/0171779 A1 | 8/2005 | Joublin |
| 2005/0234891 A1 | 10/2005 | Walther et al. |
| 2005/0246174 A1 | 11/2005 | DeGolia |
| 2005/0256866 A1 | 11/2005 | Lu et al. |
| 2006/0165104 A1 | 7/2006 | Kaye |
| 2006/0190825 A1 * | 8/2006 | Zaag ............................ 715/745 |
| 2006/0294192 A1 | 12/2006 | Mao et al. |
| 2007/0101394 A1 | 5/2007 | Fu et al. |
| 2007/0116195 A1 * | 5/2007 | Thompson et al. .......... 379/67.1 |
| 2007/0204025 A1 | 8/2007 | Cox et al. |

* cited by examiner

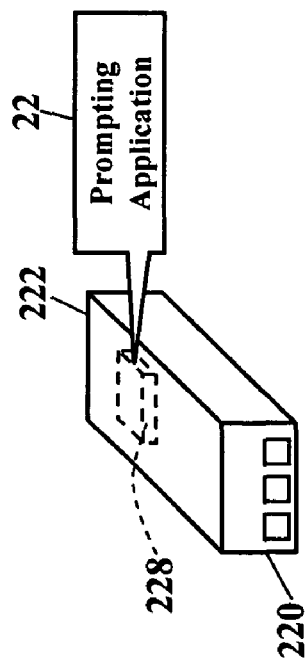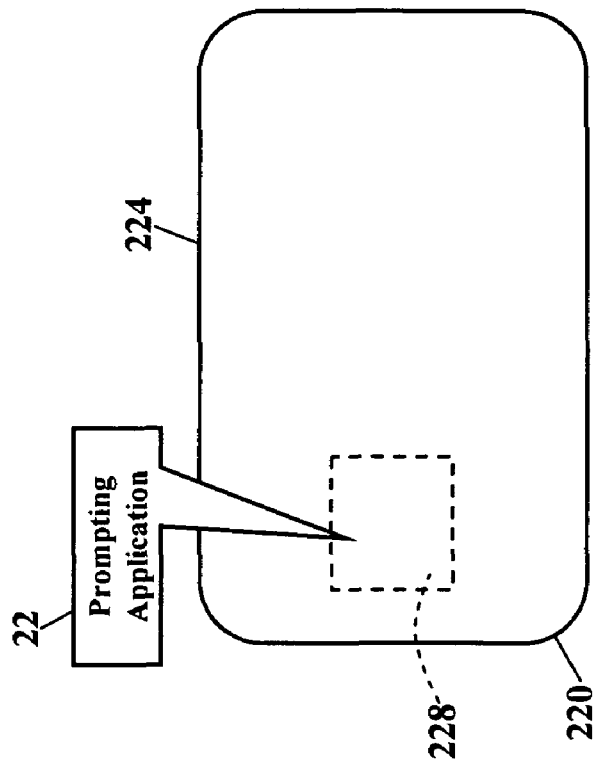
FIG. 10
FIG. 11

METHODS, SYSTEMS, AND PRODUCTS FOR PROCESSING RESPONSES IN PROMPTING SYSTEMS

NOTICE OF COPYRIGHT PROTECTION

A portion of this disclosure and its figures contain material subject to copyright protection. The copyright owner has no objection to the facsimile reproduction by anyone of the patent document or the patent disclosure, but otherwise reserves all copyrights whatsoever.

BACKGROUND

This application generally relates to communications and, more particularly, to prompting systems.

Prompting systems are very popular in today's communications environment. These prompting systems, such as an Interactive Voice Response (IVR) system, quickly direct a user to a particular department, extension, or information. These prompting systems may utilize advanced speech and voice recognition concepts to interpret responses. As users speak or otherwise enter their responses, advanced techniques are used to properly interpret those responses, despite differences in speech patterns, pronunciations, dialects, rhythm, and other differences. As software intelligence improves, prompting systems will continue to evolve to provide an efficient and less expensive method of resolving customer inquiries.

While prompting systems are great, prompting systems still have trouble understanding some responses. Despite improvements in voice recognition and in response interpretation, prompting systems still encounter responses that are not interpretable. Some responses, for example, are not understood or are incorrect. Whatever the causes, when a response is not interpretable, some prompting systems may ask for a repeat response. Other prompting systems may direct the user to an expensive human assistant. Still other prompting systems abruptly terminate the encounter. What is needed, however, is a prompting system that attempts to alternatively communicate with a user.

SUMMARY

The aforementioned problems, and other problems, are reduced, according to the exemplary embodiments, using methods, systems, and products that process responses to a prompting system. The prompting system may be voice-based, such as an Interactive Voice Response (IVR) system. The prompting system, however, could also prompt with electronic messages. However the prompts are presented, when a response is not interpretable, exemplary embodiments present alternative presentations of prompts. If a user's response to a prompt is not understood, exemplary embodiments reformat that same prompt. A voice prompt, for example, may be reformatted into an email message. The email message is then sent to an email address associated with the user. The email message prompts the user for the same information, but the email message may no longer elicit a spoken or audible response. When the user responds to the emailed prompt, the prompting system obtains that response without resorting to a more expensive human assistant and without terminating the prompting session. Additional exemplary embodiments describe how web pages, banners, text messages, and other alternative presentations may be used when responses are not interpretable. Exemplary embodiments thus utilize inexpensive alternatives to elicit responses.

The exemplary embodiments describe a method for processing responses in a prompting system. A response to a prompt is received. The response is compared to a set of conditions for interpreting the response. If the response is not interpretable, then a prioritized alternative presentation of the prompt is obtained. A supplemental prompt is sent that presents the alternative presentation.

In another of the embodiments, a system is disclosed for processing responses in a prompting system. A prompting application is stored in memory and a processor communicates with the memory. The processor receives a response to a prompt and compares the response to a set of conditions for interpreting the response. If the response is not interpretable, then the processor obtains a prioritized alternative presentation of the prompt. The processor then sends a supplemental prompt that presents the alternative presentation of the prompt.

In yet another embodiment, a computer program product is also disclosed for processing responses in a prompting. The computer program product comprises a computer-readable medium storing computer code. This computer code causes receipt of a response and compares the response to a set of conditions for interpreting the response. If the response is not interpretable, then a prioritized alternative presentation of the prompt is obtained. A supplemental prompt is sent that presents the alternative presentation of the prompt.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein:

FIGS. 8-13 are schematics illustrating various other communications devices for processing responses, according to the exemplary embodiments.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

Figure 1:
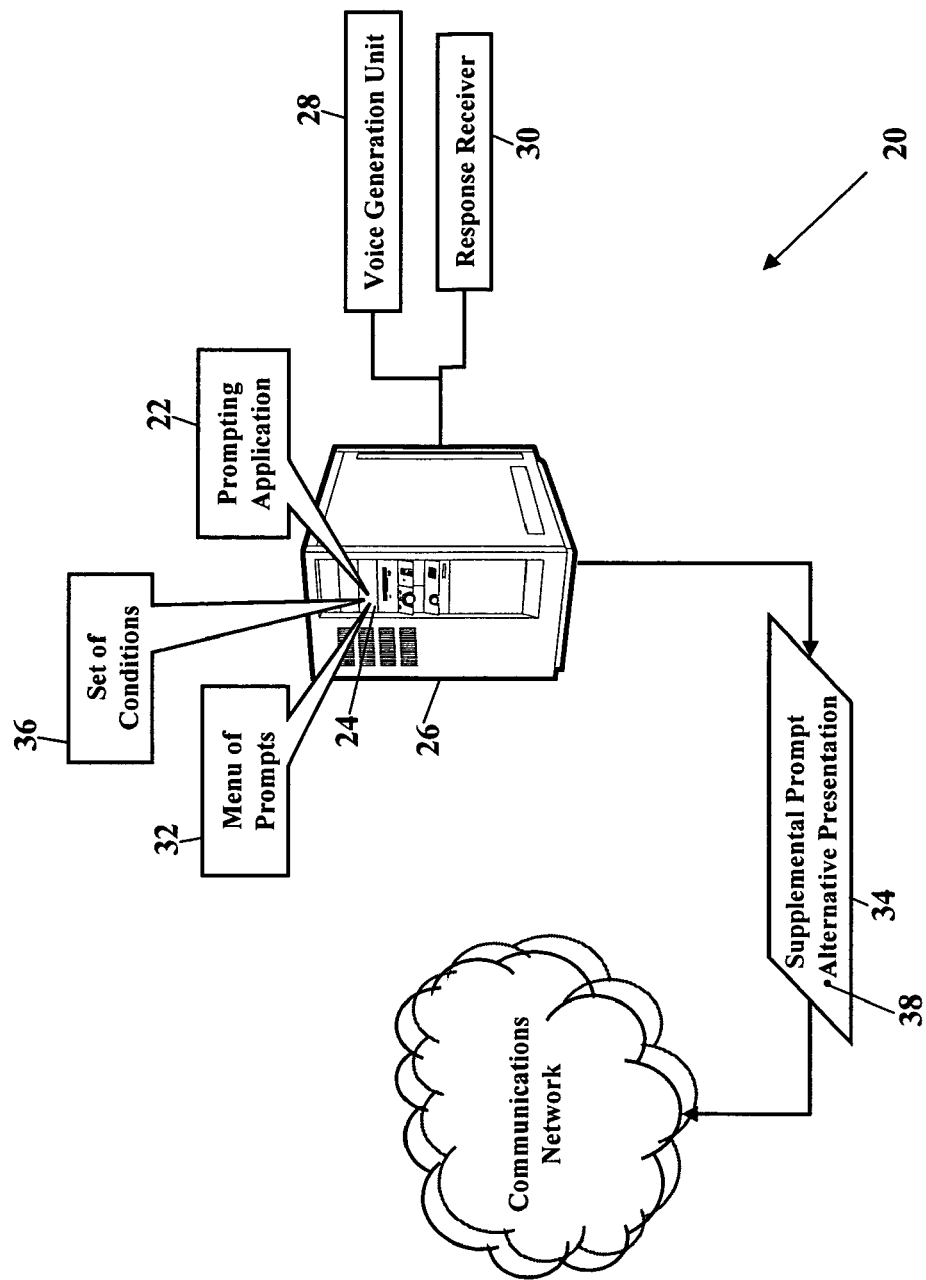
FIG. 1 is a schematic illustrating a prompting system, according to exemplary embodiments.

FIG. 1 is a schematic illustrating a prompting system 20, according to exemplary embodiments. The prompting system 20 comprises a prompting application 22 stored in memory 24 of a computer 26. The prompting system 20 may couple to a voice generation unit 28 and to a response receiver 30. The prompting system 20 audibly and/or visually presents a menu 32 of prompts to users. The menu 32 of prompts may be stored in the memory 24. If the menu 32 of prompts includes voice portions, the voice generation unit 28 generates voice messages, and the response receiver 30 receives responses to those voice messages. The responses may be Dual-Tone Model Frequency (DTMF) inputs, such that the response receiver 30 receives the DTMF inputs. The responses may be vocal or audible and analyzed and interpreted by voice recognition. The responses may be electronic messages or inputs received by the prompting application 22. Although most readers are assumed to be generally familiar with an Interactive Voice Response system, the exemplary embodiments may be applied to any type of prompting system, whether exposed by audible, voice, and/or visual prompts. Any type of prompting system, having a sequence of choices that can be exposed for searching and for entry, may utilize the exemplary embodiments. Additionally, any vendor's Interactive Voice Response application may be designed or revised to include the principles described herein. The operating principles and componentry of a typical prompting system, however, are well understood by those of ordinary skill in the art and, thus, will not be further explained here. If the reader desires a further explanation, the reader is directed to the following sources, all incorporated herein by reference: U.S. Pat. No. 4,142,067 to Williamson (Feb. 27, 1979); U.S. Pat. No. 5,553,127 to Martin et al. (Sep. 3, 1996); U.S. Pat. No. 5,872,834 to Teitelbaum (Feb. 16, 1999); U.S. Pat. No. 6,016,336 to Hanson (Jan. 18, 2000); U.S. Pat. No. 6,370,238 to Sansone et al. (Apr. 9, 2002); U.S. Pat. No. 6,456,619 to Sassin et al. (Sep. 24, 2002); U.S. Pat. No. 6,487,277 to Beyda et al. (Nov. 26, 2002); U.S. Pat. No. 6,665,644 to Kanevsky et al. (Dec. 16, 2003); U.S. Pat. No. 6,842,767 Partovi et al. (Jan. 11, 2005); U.S. Pat. No. 6,853,966 to Bushey et al. (Feb. 8, 2005); U.S. Pat. No. 6,885,733 to Pearson et al. (Apr. 26, 2005); U.S. Pat. No. 6,922,466 to Peterson et al. (Jul. 26, 2005); U.S. Pat. No. 6,944,592 to Pickering (Sep. 13, 2005); Published U.S. Patent Application 2003/0232640 to Walker et al. (Dec. 18, 2003); Published U.S. Patent Application 2004/0006476 to Chiu (Jan. 8, 2004); Published U.S. Patent Application 2004/0042592 to Knott et al. (Mar. 4, 2004); Published U.S. Patent Application 2005/0027536 to Matos et al. (Feb. 3, 2005); Published U.S. Patent Application 2005/0069122 to Lin. (Mar. 31, 2005);

The prompting system 20, however, differs from a conventional prompting system. Here the prompting system 20, under certain conditions, sends a supplemental prompt 34. As users speak, send, enter, or otherwise indicate their responses to the menu 32 of prompts, each response is compared to a set 36 of conditions. The set 36 of conditions are used to interpret the responses. If one or more responses are not interpretable, then the prompting application 22 obtains an alternative presentation 38 of the prompt. As the following paragraphs will explain in greater detail, the alternative presentation 38, for example, may be a textual, visual, or multimedia representation of a prompt. The prompting application 22 then sends the supplemental prompt 34, and the supplemental prompt 36 presents the alternative presentation 38 of the prompt. The prompting application 22, then, resends the prompt, but the prompt is presented in an alternative format. Suppose, for example, that the menu 32 of prompts asks the user to speak a response to a prompt. If the user speaks too softly, then the response receiver 30 may not discern the user's response. Because the user's response is not interpretable, the prompting application 22 forms the alternative presentation 38 of the prompt. The supplemental prompt 34 may thus be a visual, textual, or multimedia version of the same prompt, but the supplemental prompt 34 may elicit a non-verbal response. The supplemental prompt 34, for example, may be an electronic message or XML page that is sent to the user. The supplemental prompt 34 may even elicit a tactile response (perhaps via a keypad or pointing device) to the prompt. The supplemental prompt 34 has a different presentation of the prompt, thus helping ensure the user's responses are adequately received and properly interpreted.

The set 36 of conditions are used to interpret the responses. The set 36 of conditions represent logical branch/tree statements for determining whether a response is understood. The set 36 of conditions, for example, could be logical "if/then/else" statements that invoke software, hardware, or control modules. Using the above example, if the user speaks too softly, then the response receiver 30 may not discern the user's response. The set 36 of conditions, then, may call an email module to send a supplemental prompting email to the user. The set 36 of conditions may additionally or alternatively call an eXtensible Markup Language (XML) module to send an XML web page to the user. If a supplemental prompt still receives an non-interpretable response, or no response, then the set 36 of conditions may invoke an exception module that presents a final prompt (e.g., "we are unable to understand your response, please call back"). The set 36 of conditions may include various statements for interpreting responses, including speech/vocal recognition techniques and electronic messaging and communication parameters. The set 36 of conditions, then, may be populated with known statements for recognizing and processing audible, spoken, tonal, and electronic responses to the menu 32 of prompts. A complete description of the set 36 of conditions, however, is beyond the scope of this disclosure. Moreover, because such techniques are known to those of ordinary skill in the art, the set 36 of conditions need not be further explained.

In the figures described below, as in FIG. 1, reference numeral 20 refers to a prompting system and reference numeral 22 refers to a prompting application. The reader, however, will appreciate that the prompting system 20 and the prompting application 22 need not include all the elements and capabilities described. Rather, the prompting system 20 and the prompting application 22, according to exemplary embodiments, may include one or any combination of elements and capabilities for supplementing prompts.

Figure 2:
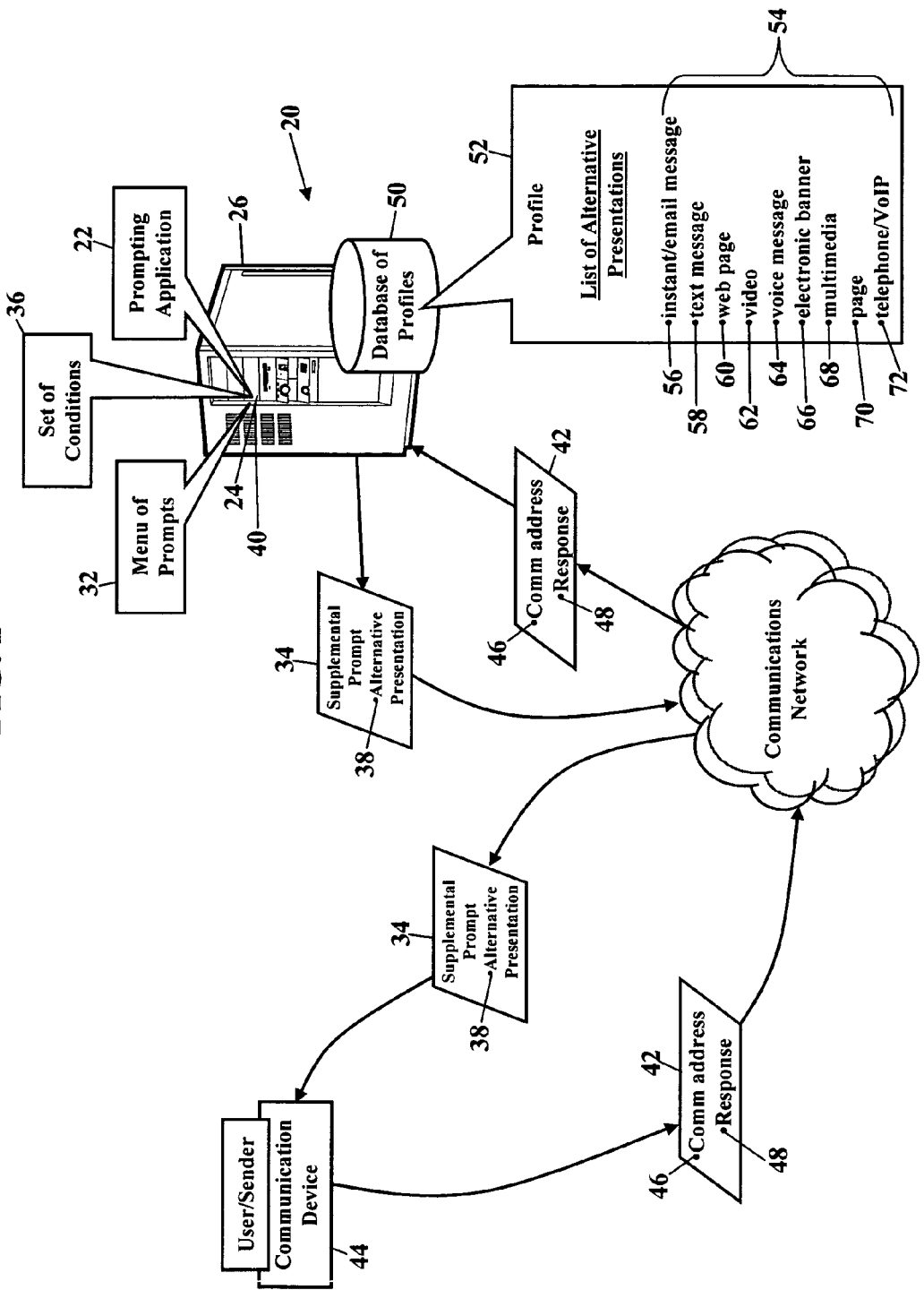
FIG. 2 is another schematic illustrating a system for processing responses, according to exemplary embodiments.

FIG. 2 is another schematic illustrating a system for processing responses, according to exemplary embodiments. The prompting application 22 (stored in the memory 24 of the computer 26) causes a processor 40 to receive a communication 42 from the user's communications device 44. The communication 42 may include a communications address 46 (or other identifying information) of the user's communications device 44. The communication 42 may also include a response 48 to the menu 32 of prompts. The prompting application 22 compares the response 48 to the set 36 of conditions for interpreting the response. If the response 48 is not interpretable, then the prompting application 22 accesses a database 50 of profiles. The database 50 of profiles stores a profile 52 associated with the communications address 46 of the communications device 44. The profile 52 stores a list 54 of alternative presentations for prompts. The list 54 of alternative presentations represents alternative formats for supplemental prompts. The list 54 of alternative presentations, for example, may include an instant or email message 56, a text message 58, a web page 60, a video 62, a voice message 64, an electronic banner message 66, a multimedia communication 68, a page message 70, and a telephone or Voice over Internet Protocol (VoIP) 72. FIG. 2, however, is not intended to be an exhaustive listing of alternative presentations. The list 54 of alternative presentations may include any vocal/audible presentation, tonal presentation (e.g., DTMF), textual presentation, and or visual presentation of a prompt, using any form of communication. The list 54 of alternative presentations may be prioritized, such that the prompting application 22 sequentially attempts each entry. However the list 54 of alternative presentations is configured, the prompting application 22 causes the processor 40 to obtain the alternative presentation 38 of the prompt. The prompting application 22 causes the processor 40 to send the supplemental prompt 34 to the communications device 44, and the supplemental prompt 34 presents the alternative presentation 38 of the prompt.

Figure 3:
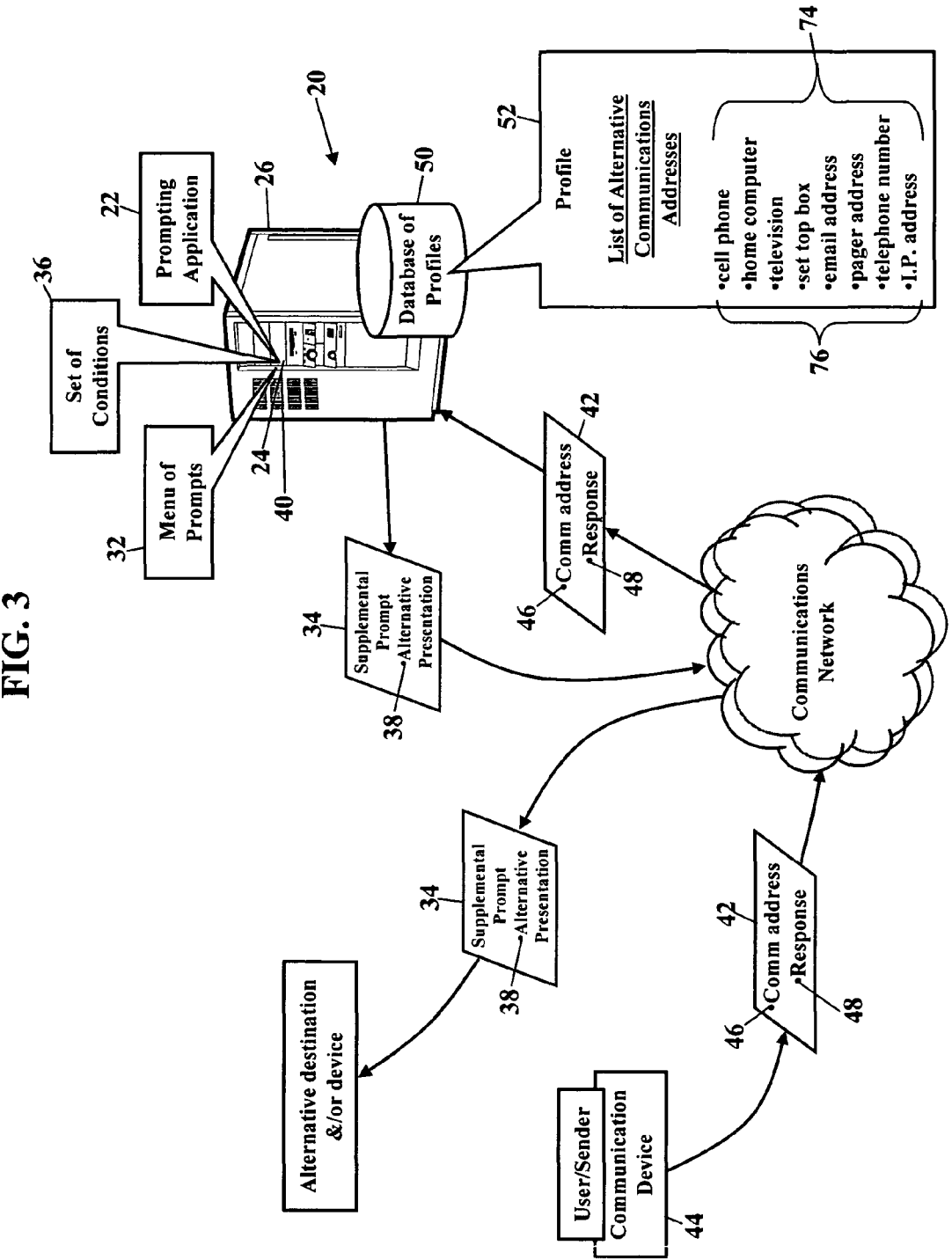
FIGS. 3 and 4 are more schematics illustrating the prompting system, according to more exemplary embodiments.

FIG. 3 is another schematic illustrating the prompting system 20, according to more exemplary embodiments. Here the prompting application 22 causes the processor 40 to access a list 74 of communications addresses. When the computer 26 receives the response 48, the prompting application 22 again compares the response 48 to the set 36 of conditions. If the response 48 is not interpretable, then the prompting application 22 again accesses the list of alternative presentations (shown as reference numeral 54 in FIG. 2) and obtains the alternative presentation 38 of the prompt. Yet here the prompting application 22 also retrieves a communications address 76 from the list 74 of communications addresses. The list 74 of communications addresses stores alternative addresses to which the supplemental prompt 34 may be sent. That is, when the supplemental prompt 34 is formatted as the alternative presentation 38, the supplemental prompt 34 may be sent to the user's communications device 44. The prompting application 22, however, may additionally or alternatively send the supplemental prompt 34 to any communications address in the list 74 of communications addresses. The list 74 of communications addresses may be populated with alternative destinations and/or devices which may receive the supplemental prompt 34. The user, for example, may want the supplemental prompt 34 sent to the user's cell phone, home computer, web-enabled or digital television, set-top box, or any other communications device. The user may even specify alterative destinations, such as work computer, work phone, home phone, friend or family member device/destination, or any other destination. Each communications address 76 in the list 74 of communications addresses may be any communications address, such as a telephone number, pager number, Internet Protocol address, physical address, or any other communications address. The list 74 of communications addresses may be prioritized, such that the prompting application 22 sequentially attempts each entry. However the list 74 of communications addresses is configured, the prompting application 22 causes the processor 40 to obtain the communications address 76 and to send the supplemental prompt 34 to the communications address 76. The supplemental prompt 34 presents the alternative presentation 38 of the prompt.

Figure 4:
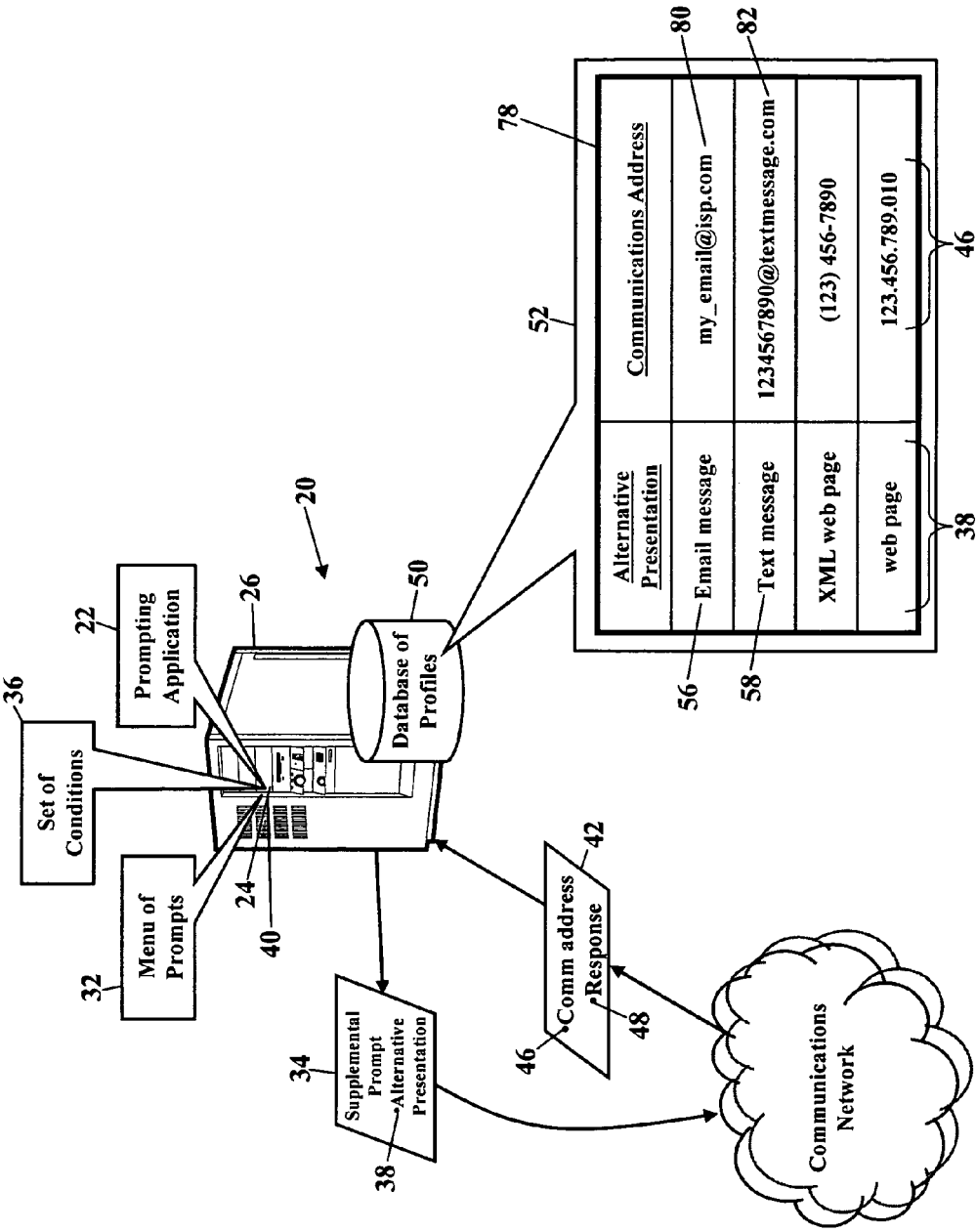

FIG. 4 is yet another schematic illustrating the prompting system 20, according to still more exemplary embodiments. Here the user configures his or her profile 52 with a prioritized list of supplemental prompts. The user prioritizes the alternative presentation 38 that is sent to the communications address 46. The user's profile 52 may include a table 78. The table 78 maps an alternative presentation 38 to its associated communications address 46. As FIG. 4 illustrates, for example, the user may associate the alternative email presentation 56 to the user's email address 80. The table 78 also associates the alternative text message presentation 58 to a cell phone text message address 82. The user may continue populating the table 78 with other alternative presentations 38 and their associated destination addresses.

The prompting application 22 then operates as before. When the computer 26 receives the response 48, the prompting application 22 compares the response 48 to the set 36 of conditions. If the response 48 is not interpretable, then the prompting application 22 accesses the database 50 of profiles. The database 50 of profiles stores the profile 52 associated with the communications address 46 of the user's communications device 44. The profile 52 maintains the table 78 that associates alternative presentations with communications addresses. The prompting application 22 causes the processor 40 to sequentially or randomly obtain an alternative presentation 38 and its associated communications address 46. The processor 40 then sends the supplemental prompt 34 to the communications address 46, and the supplemental prompt 34 presents the alternative presentation 38 of the prompt.

Figure 5:
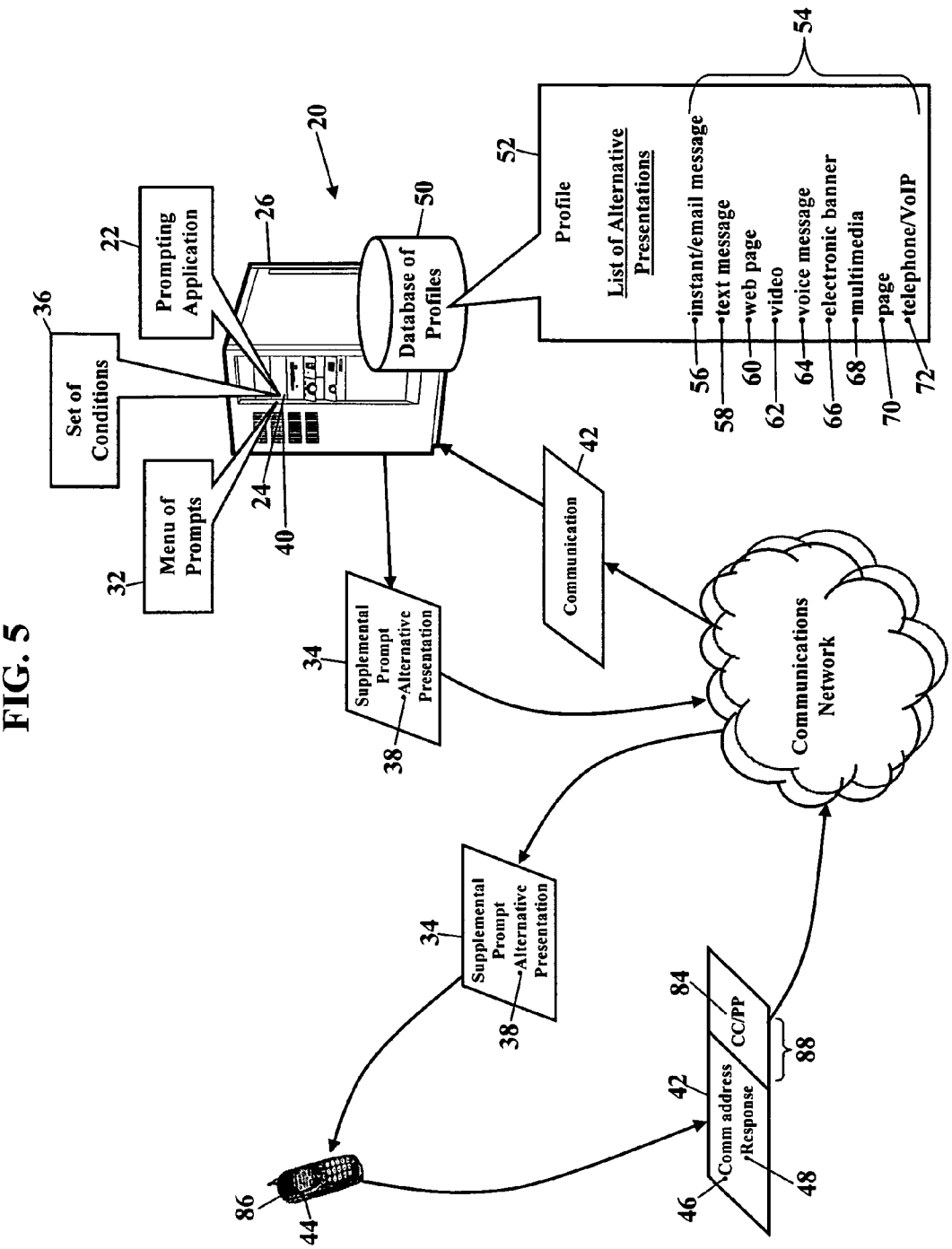
FIG. 5 is a schematic illustrating the prompting system utilizing CC/PP information, according to more exemplary embodiments.

FIG. 5 is a schematic illustrating the prompting system 20, according to more exemplary embodiments. Here the prompting application 22 uses Composite Capabilities/Preference Profiles (CC/PP) information 84 to form the supplemental response 48. The prompting application 22 selects and/or formats the supplemental response 48 according to the CC/PP information 84. As those of ordinary skill in the art understand, CC/PP information provides a structure and a vocabulary for describing a communications device's hardware capabilities, software capabilities, and user preferences. Because Composite Capability/Preference Profile information is already known, this specification will not provide a detailed explanation of such information. If, however, the reader desires a detailed explanation, the reader is invited to consult W3C, *Composite Capability/Preference Profiles (CC/PP): Structure and Vocabularies*, available from the World Wide Web Consortium (W3C), 32 Vassar Street, Room 32-G515, Cambridge, Mass. 02139 USA and from the European Office of the World Wide Web Consortium (W3C), 2004, route des Lucioles, BP 93, 06902 Sophia-Antipolis Cedex France, and incorporated herein by reference in its entirety.

FIG. 5 illustrates the CC/PP information 84. The prompting application 22 again receives the communication 42 from the user's communications device 44. The user's communications device 44 is shown as a mobile phone 86, but the communications device 44, as later paragraphs will explain, may be any other device. The communication 42 may include the communications address 46 (or other identifying information) of the user's communications device 44 and the response 48 to the menu 32 of prompts. Here the communication 42 also includes the CC/PP information 84. The CC/PP information 84 may be contained within any portion of the communication 42, but the CC/PP information 84 is typically contained within a header portion 88. When the computer 26 receives the response 48, as before, the prompting application 22 compares the response 48 to the set 36 of conditions. If the response 48 is not interpretable, then the prompting application 22 prepares the supplemental prompt 34. Here, however, the prompting application 22 may use the CC/PP information 84 to determine the communications device's hardware capabilities, software capabilities, and user preferences.

The prompting application 22, for example, may select an alternative presentation based on the CC/PP information 84. When the prompting application 22 accesses the list 54 of alternative presentations, the prompting application 22 may select an alternative presentation that is compatible with the user's communications device 44. If, for example, the CC/PP information 84 indicates that the user's mobile phone 86 does not have video capabilities, then the prompting application 22 may decline to select the alternative video presentation 62 (and perhaps the alternative multimedia presentation 68). If the CC/PP information 84 indicates that the user's mobile phone 86 does not have a color display, then the prompting application 22 may select a black and white or grayscale alternative. If the CC/PP information 84 indicates that the user's mobile phone 86 has a slow bandwidth connection, a slower processor, or low memory, then the prompting application 22 may select a less bandwidth intensive alternative presentation. Whatever the CC/PP information 84 indicates, the prompting application 22 may select an alternative presentation based on the CC/PP information 84. The processor 40 then sends the supplemental prompt 34 as before.

The prompting application 22 may format the supplemental response 48 according to the CC/PP information 84. Whether or not the CC/PP information 84 is used to select the alternative presentation, the prompting application 22 may format the supplemental response 48 according to the CC/PP information 84. Suppose the CC/PP information 84 indicates that the user's communications device 44 (e.g., the mobile phone 86) has a color display with a 120×120 resolution. The prompting application 22, then, may format the supplement response 48 to best suit this display. If the CC/PP information 84 indicates that the user's communications device 44 has calendar capabilities, then the prompting application 22 may format the supplement response 48 as a task or reminder to further prompt the user. If the CC/PP information 84 indicates that the user's mobile phone 86 is connected to a car kit, then the prompting application 22 may format the supplement response 48 with louder audible/spoken portions to overcome background or road noise. Again, whatever the CC/PP information 84 indicates, the prompting application 22 may format the supplement response 48 based on the CC/PP information 84. The processor 40 then sends the supplemental prompt 34 as before.

The user may configure his or her profile 52 with emergency contacts. For example, the user may configure the profile 52 to include emergency contact information to be used if the user's responses cannot be interpreted, once all the alternative presentations and the alternative communications addresses have been attempted. As the above paragraphs explained, the set 36 of conditions include an exception when all other conditions have failed (e.g., "we are unable to understand your response, please call back"). Here, however, the exception condition may cause prompts to be sent to friends, relatives, or even emergency personnel. If an elderly person, for example, fails to response to all the alternative presentations, that elderly person may want their son or daughter to be immediately notified. Parents may establish exception/emergency contacts for their children. Businesses may establish exception/emergency contacts for other personnel. Whatever the situation, the user's profile 52 may include exception/emergency contacts.

Figure 6:
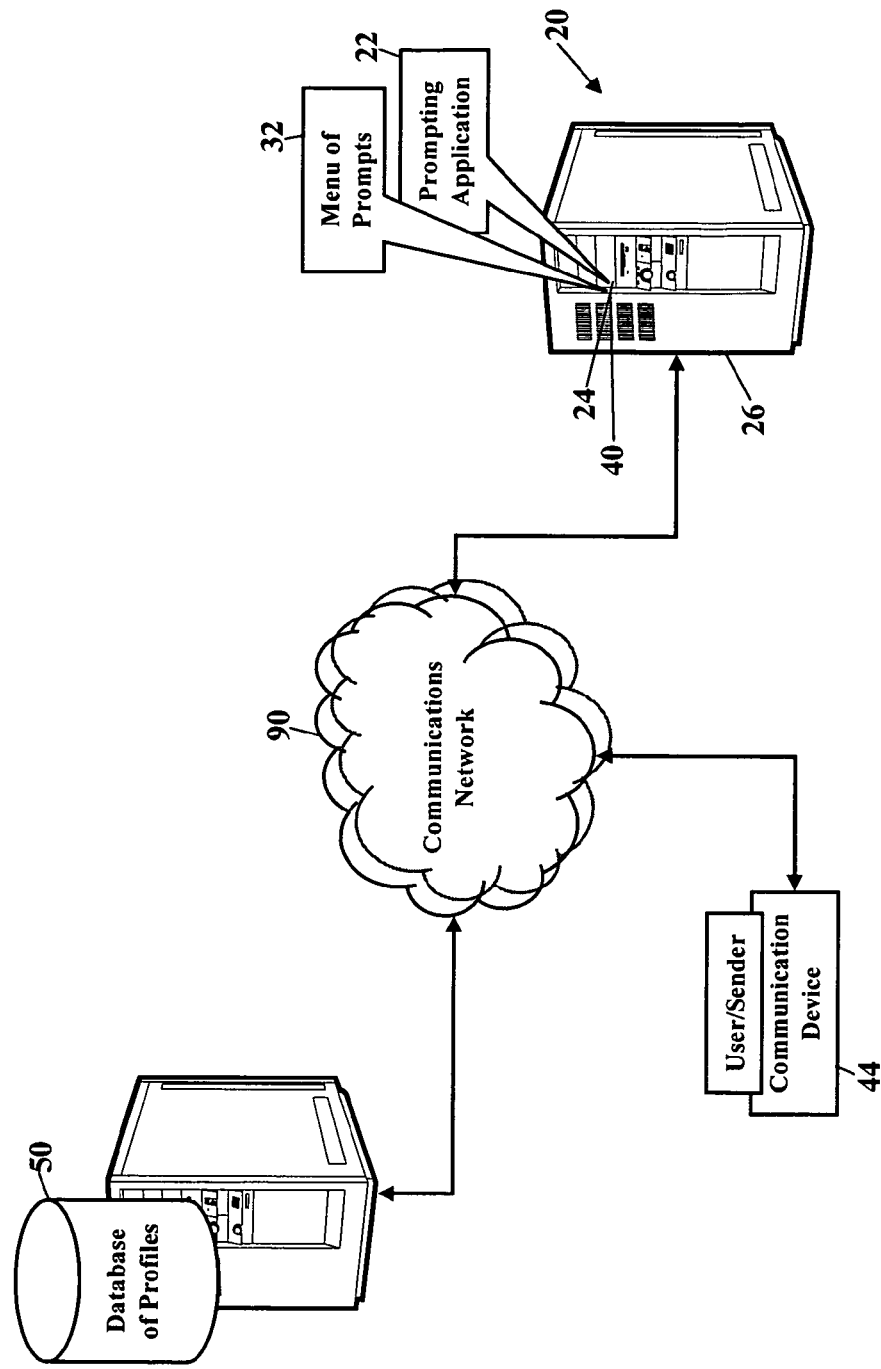
FIG. 6 is a schematic illustrating another network operating environment, according to the exemplary embodiments.

FIG. 6 is a schematic illustrating another network operating environment, according to the exemplary embodiments. Here the prompting application 22 operates within a network environment. That is, the prompting application 22 is remotely located from the database 50 of profiles. When the prompting application 22 queries the database 50 of profiles, queries are sent via a communications network 90. The database 50 of profiles then sends a response via the communications network 90. Networking environments, however, are well known and need not be further discussed. FIG. 6 simply illustrates that exemplary embodiments may operate in any networking environment.

The exemplary embodiments may be applied regardless of networking environment. The communications network 90 may be a cable network operating in the radio-frequency domain and/or the Internet Protocol (IP) domain. The communications network 90 may have POTS components and/or features. The communications network 90, however, may also include a distributed computing network, such as the Internet (sometimes alternatively known as the "World Wide Web"), an intranet, a local-area network (LAN), and/or a wide-area network (WAN). The communications network 90 may include coaxial cables, copper wires, fiber optic lines, and/or hybrid-coaxial lines. The communications network 90 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

Figure 7:
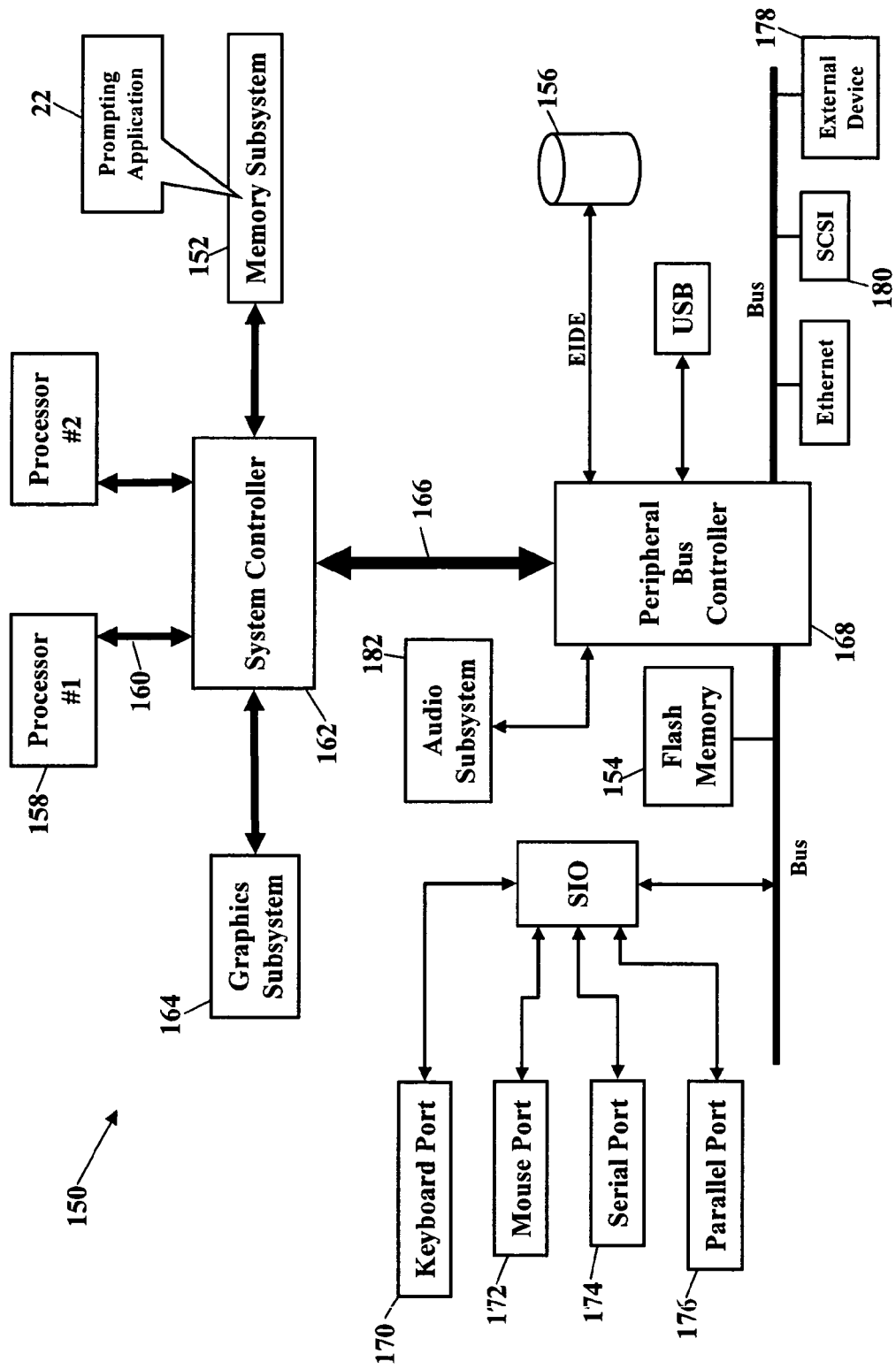
FIG. 7 depicts a possible operating environment for exemplary embodiments.

FIG. 7 depicts a possible operating environment for exemplary embodiments. FIG. 7 is a block diagram showing the prompting application 22 residing in a processor-controlled system 150 (such as the computer 26 shown in FIGS. 1-6). FIG. 7, however, may also represent a block diagram of any computer or communications device in which the prompting application 22 may operate. The prompting application 22 operates within a system memory device. The prompting application 22, for example, is shown residing in a memory subsystem 152. The prompting application 22, however, could also reside in flash memory 154 or peripheral storage device 156. The computer system 150 also has one or more central processors 158 executing an operating system. The operating system, as is well known, has a set of instructions that control the internal functions of the computer system 150. A system bus 160 communicates signals, such as data signals, control signals, and address signals, between the central processor 158 and a system controller 162. The system controller 162 provides a bridging function between the one or more central processors 158, a graphics subsystem 164, the memory subsystem 152, and a PCI (Peripheral Controller Interface) bus 166. The PCI bus 166 is controlled by a Peripheral Bus Controller 168. The Peripheral Bus Controller 168 is an integrated circuit that serves as an input/output hub for various peripheral ports. These peripheral ports could include, for example, a keyboard port 170, a mouse port 172, a serial port 174, and/or a parallel port 176 for a video display unit, one or more external device ports 178, and external hard drive ports 180 (such as IDE, ATA, SATA, or SCSI). The Peripheral Bus Controller 168 could also include an audio subsystem 182. Those of ordinary skill in the art understand that the program, processes, methods, and systems described herein are not limited to any particular computer system or computer hardware.

One example of the central processor 158 is a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

According to an exemplary embodiment, any of the WINDOWS® (WINDOWS® is a registered trademark of Microsoft Corporation, One Microsoft Way, Redmond Wash. 98052-6399, 425.882.8080, www.Microsoft.com) operating systems may be used. Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

The system memory device (shown as memory subsystem 152, flash memory 154, or peripheral storage device 156) may also contain an application program. The application program cooperates with the operating system and with a video display unit (via the serial port 174 and/or the parallel port 176) to provide a Graphical User Interface (GUI). The Graphical User Interface typically includes a combination of signals communicated along the keyboard port 170 and the mouse port 172. The Graphical User Interface provides a convenient visual and/or audible interface with a subscriber of the computer system 150.

Figure 8:
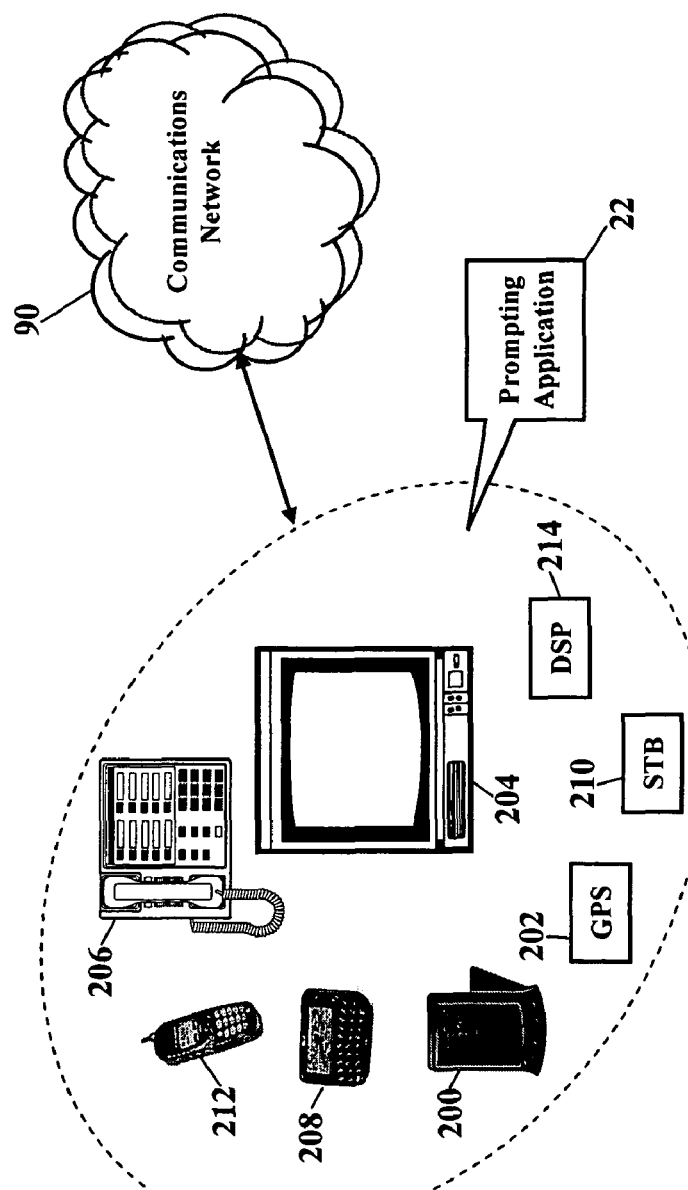

FIG. 8 is a schematic illustrating still more exemplary embodiments. FIG. 8 illustrates that the prompting application 22 may alternatively or additionally operate within various other communications devices. FIG. 8, for example, illustrates that the prompting application 22 may entirely or partially operate within a personal digital assistant (PDA) 200, a Global Positioning System (GPS) device 202, an interactive television 204, an Internet Protocol (IP) phone 206, a pager 208, a set-top-box (STB) 210, a cellular/satellite phone 212, or any computer system and/or communications device utilizing a digital signal processor (DSP) 214. The communications device may also include watches, radios, vehicle electronics, clocks, printers, gateways, and other apparatuses and systems.

Figure 9:
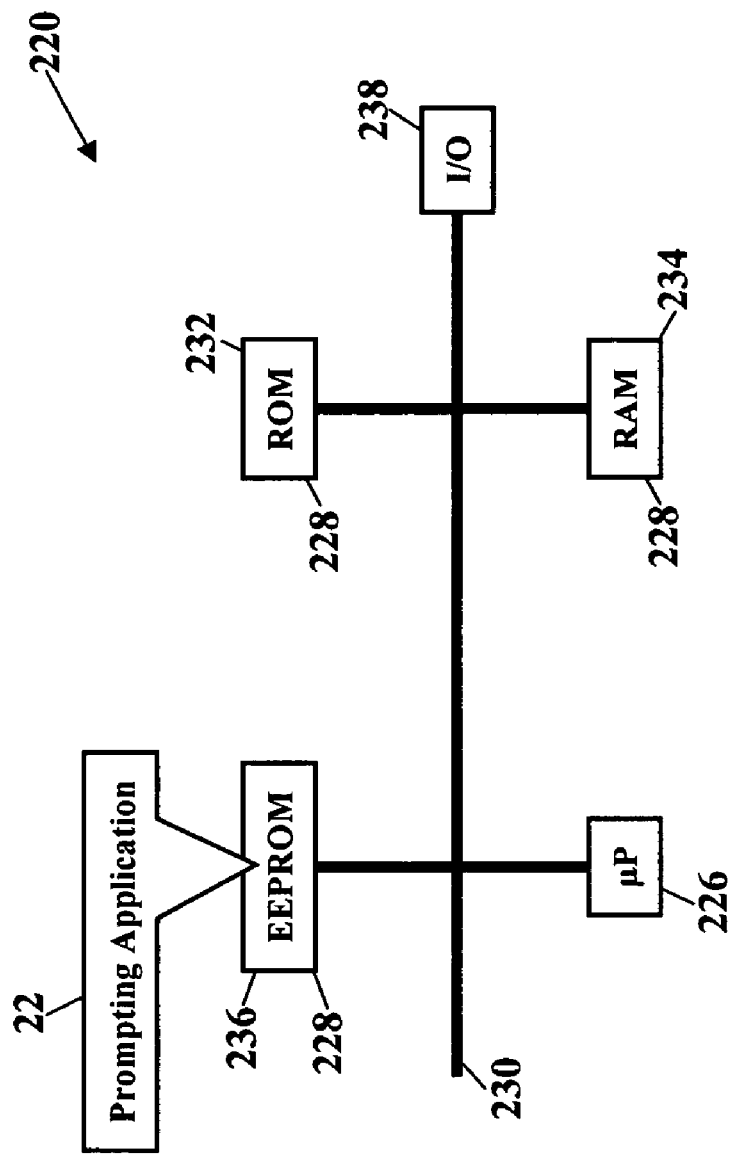

FIGS. 9-11 are schematics further illustrating various other communications devices for processing responses, according to the exemplary embodiments. FIG. 9 is a block diagram of a Subscriber Identity Module 220, while FIGS. 10 and 11 illustrate, respectively, the Subscriber Identity Module 220 embodied in a plug 222 and the Subscriber Identity Module 220 embodied in a card 224. As those of ordinary skill in the art recognize, the Subscriber Identity Module 220 may be used in conjunction with many communications devices (such as those shown in FIG. 8). The Subscriber Identity Module 220 stores subscriber information (such as the subscriber's International Mobile Subscriber Identity, the subscriber's $K_i$ number, and other subscriber information), perhaps the subscriber's profile (shown as reference numeral 108), and any portion of the prompting application 22. As those of ordinary skill in the art also recognize, the plug 222 and the card 224 each interface with the communications device according to GSM Standards 2.17 and 11.11 and ISO Standard 7816, with each incorporated herein by reference. The GSM Standard 2.17 is formally known as "European digital cellular telecommunications system (Phase 1); *Subscriber Identity Modules, Functional Characteristics* (GSM 02.17 V3.2.0 (1995-01))." The GSM Standard 11.11 is formally known as "Digital cellular telecommunications system (Phase 2+) (GSM); *Specification of the Subscriber Identity Module—Mobile Equipment (Subscriber Identity Module—ME) interface* (GSM 11.11 V5.3.0 (1996-07))." Both GSM standards are available from the European Telecommunication Standards Institute (650 route des Lucioles, 06921 Sophia-Antipolis Cedex, FRANCE, Tel.:+33 (0)4 92 94 42 00, Fax:+33 (0)4 93 65 47 16, www.etsi.org). The ISO Standard 7816 is formally known as "*Information technology—Identification cards—Integrated circuit(s) cards with contacts*," and the standard is available from the International Organization for Standardization (ISO) (1, rue de Varembé, Case, postale 56CH-1211 Geneva 20, Switzerland, Telephone+41 22 749 01 11, Telefax+41 22 733 34 30, www.iso.org).

FIG. 9 is a block diagram of the Subscriber Identity Module 220, whether embodied as the plug 222 of FIG. 10 or as the card 224 of FIG. 11. Here the Subscriber Identity Module 220 comprises a microprocessor 226 (μP) communicating with memory modules 228 via a data bus 230. The memory modules may include Read Only Memory (ROM) 232, Random Access Memory (RAM) and or flash memory 234, and Electrically Erasable-Programmable Read Only Memory (EEPROM) 236. The Subscriber Identity Module 220 stores some or all of the prompting application 22 in one or more of the memory modules 228. FIG. 9 shows the prompting application 22 residing in the Erasable-Programmable Read Only Memory 236, yet the prompting application 22 could alternatively or additionally reside in the Read Only Memory 232 and/or the Random Access/Flash Memory 234. An Input/

Output module 238 handles communication between the Subscriber Identity Module 220 and the communications device. As those skilled in the art will appreciate, there are many suitable ways for implementing the operation and physical/memory structure of the Subscriber Identity Module. If, however, the reader desires more information on the Subscriber Identity Module, the reader is directed to the following sources: LAWRENCE HARTE et al., GSM SUPERPHONES 99-100, 113-14 (1999); SIEGMUND REDL et al., GSM AND PERSONAL COMMUNICATIONS HANDBOOK 303-69 (1998); and JOACHIM TISAL, GSM CELLULAR RADIO TELEPHONY 99-130 (1997), with each incorporated herein by reference.

Figure 12:
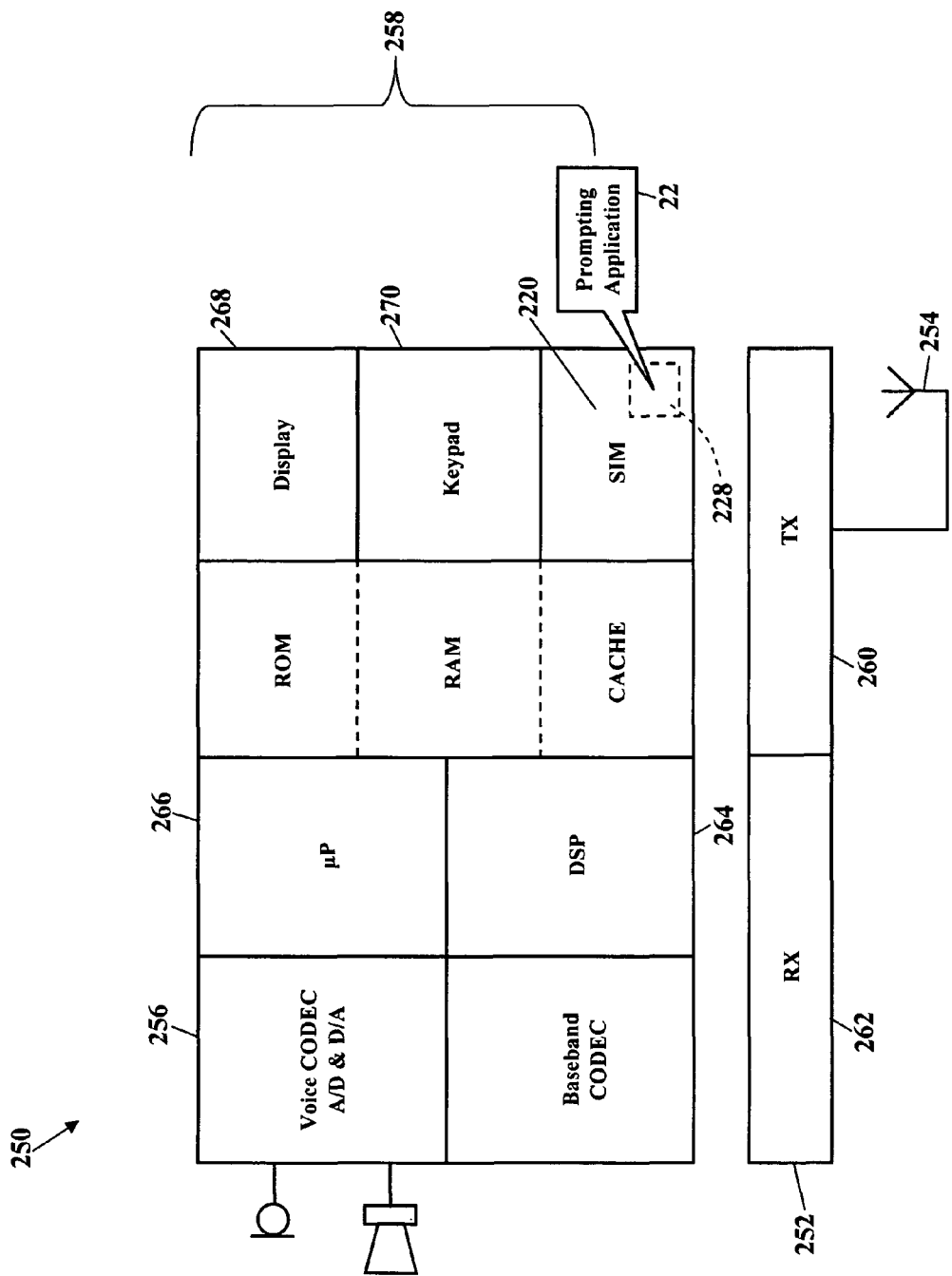

FIG. 12 is a schematic further illustrating various communications devices for processing responses, according to the exemplary embodiments. FIG. 12 is a block diagram of another communications device 250 utilizing any portion of the prompting application 22. In one embodiment, the communications device 250 comprises a radio transceiver unit 252, an antenna 254, a digital baseband chipset 256, and a man/machine interface (MMI) 258. The transceiver unit 252 includes transmitter circuitry 260 and receiver circuitry 262 for receiving and transmitting radio-frequency (RF) signals. The transceiver unit 252 couples to the antenna 254 for converting electrical current to and from electromagnetic waves. The digital baseband chipset 256 contains a digital signal processor (DSP) 264 and performs signal processing functions for audio (voice) signals and RF signals. As FIG. 12 shows, the digital baseband chipset 256 may also include an on-board microprocessor 266 that interacts with the man/machine interface (MMI) 258. The man/machine interface (MMI) 258 may comprise a display device 268, a keypad 270, and the Subscriber Identity Module 220. The on-board microprocessor 266 performs GSM protocol functions and control functions for the radio circuitry 260 and 262, for the display device 268, and for the keypad 270. The on-board microprocessor 266 may also interface with the Subscriber Identity Module 220 and with the prompting application 22 residing in the memory module 228 of the Subscriber Identity Module 220. Those of ordinary skill in the art will appreciate that there may be many suitable architectural configurations for the elements of the communications device 250. If the reader desires a more detailed explanation, the reader is invited to consult the following sources: LAWRENCE HARTE et al., GSM SUPERPHONES 105-120 (1999); SIEGMUND REDL et al., GSM AND PERSONAL COMMUNICATIONS HANDBOOK 389-474 (1998); and JOACHIM TISAL, GSM CELLULAR RADIO TELEPHONY 99-130 (1997), with each incorporated herein by reference.

The prompting application 22 may be utilized regardless of signaling standard. As those of ordinary skill in the art recognize, FIGS. 9-12 illustrate a Global System for Mobile (GSM) communications device. That is, the communications device utilizes the Global System for Mobile (GSM) communications signaling standard. Those of ordinary skill in the art, however, also recognize the prompting application 22 is equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard.

Figure 13:
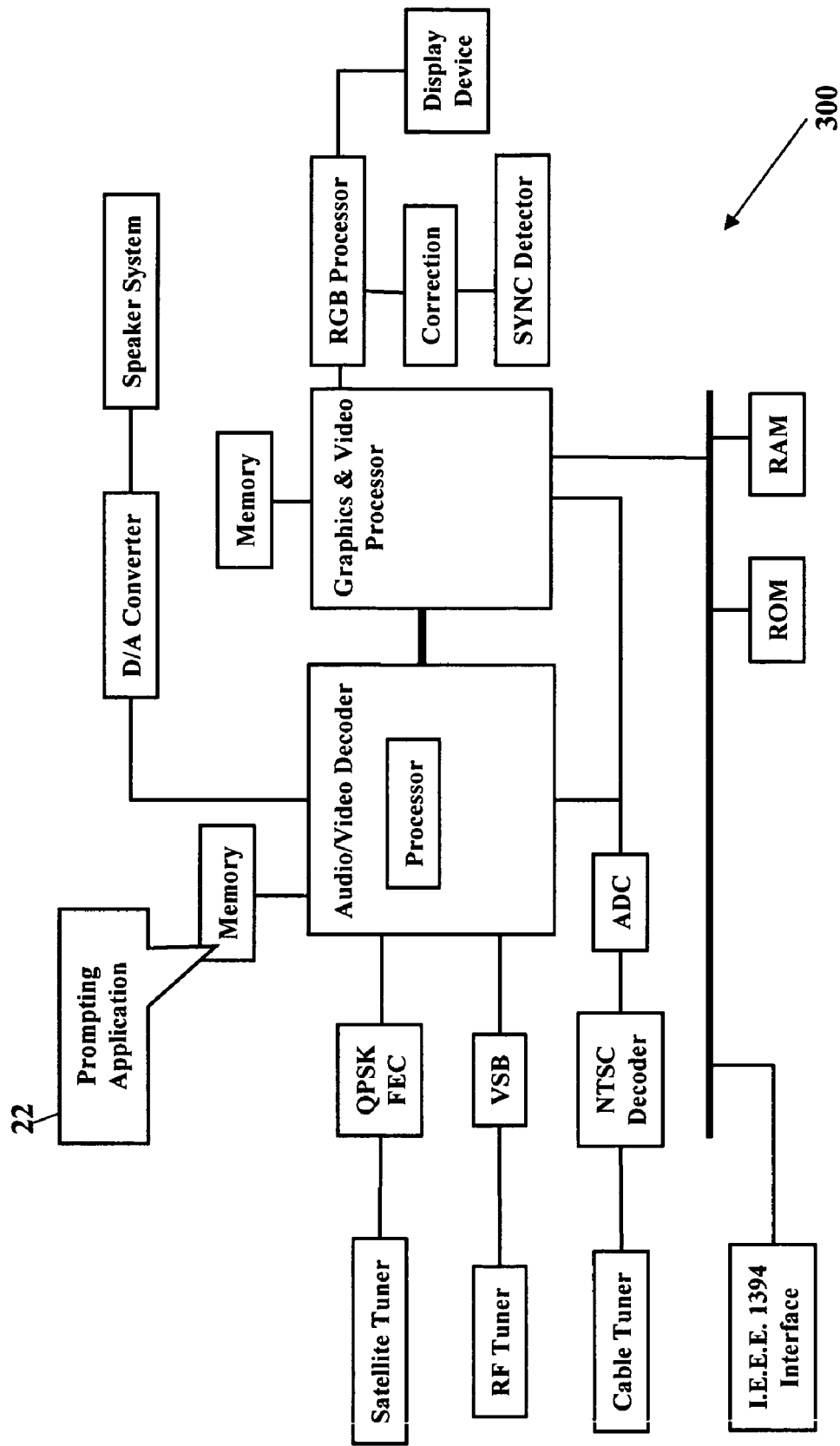

FIG. 13 is a block diagram illustrating another communications device in which the prompting application 22 may operate, according to yet more of the exemplary embodiments. Here the communications device is shown as a digital high definition television (HDTV) system 300. Although an HDTV system is shown, the exemplary embodiments are applicable to any television design. The concepts, for example, are applicable to analog circuitry, digital circuitry, analog signals, and/or or digital signals. The television may include an encoder/decoder, such as an embedded set-top box. The term "television," however, may encompass a stand-alone set-top box that is a separate component from the television. The television may also utilize any display device technology, such as a cathode-ray, a liquid crystal, a diode, digital micromirror, light processor, or plasma. The prompting application 22 may be stored in any memory location or device in the television 300. FIG. 13, though, is only a simplified block diagram. The operating and engineering principles are already known in the art and will not be repeated here. If, however, the reader desires more information on the television, the reader is directed to the following sources: MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, ITV HANDBOOK: TECHNOLOGIES AND STANDARDS (2004), with each incorporated herein by reference.

Figure 14:
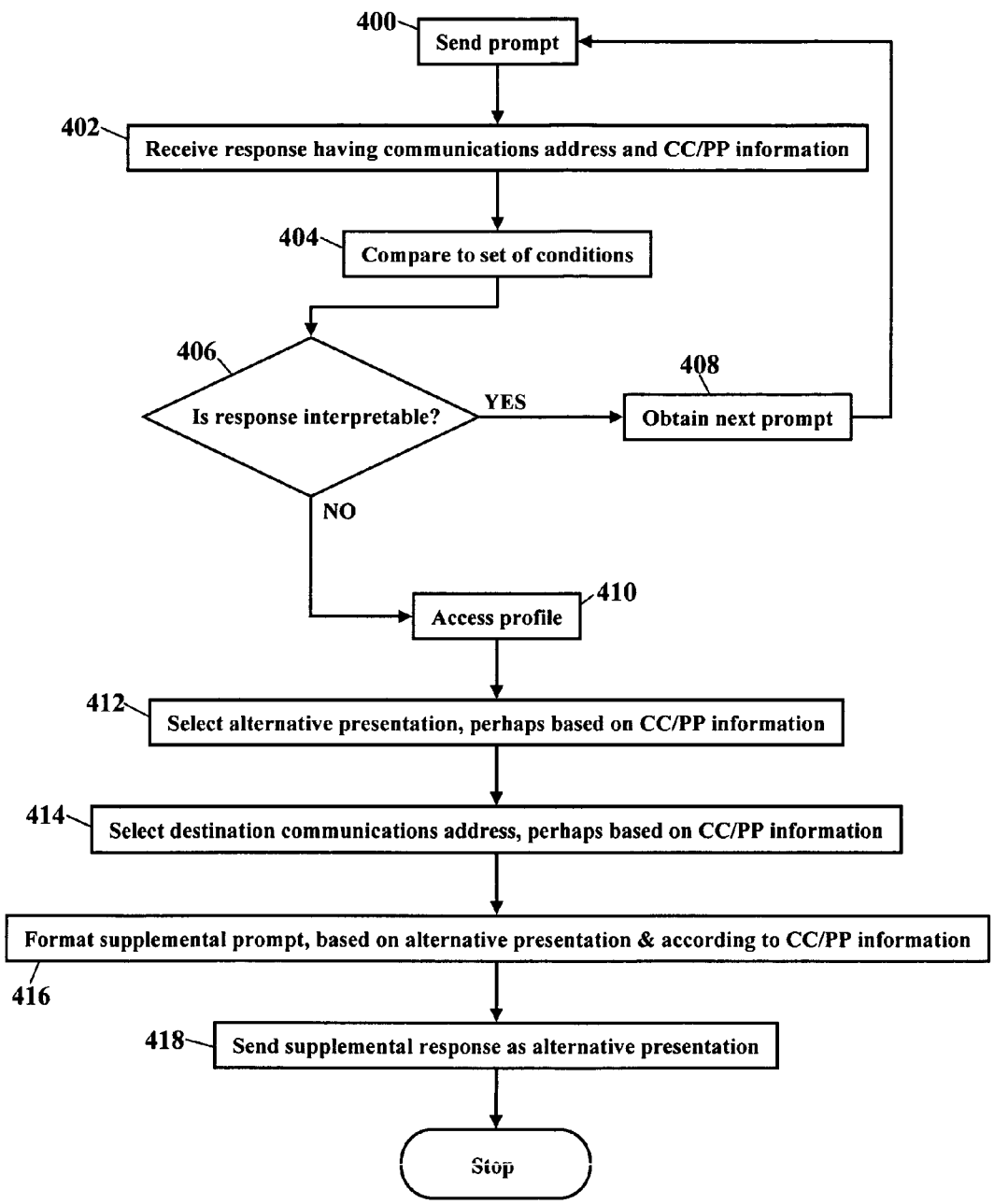
FIGS. 14-17 are flowcharts illustrating methods of processing responses in a prompting system, according to more exemplary embodiments.

FIG. 14 is a flowchart illustrating a method of processing responses in a prompting system, according to more exemplary embodiments. A prompt is sent (Block 400) and a response is received (Block 402). The response may include a communications address and CC/PP information. The response is compared to a set of conditions for interpreting the response (Block 404). If the response is determined to be interpretable (Block 406), then a next prompt is prepared (Block 408) and sent (Block 400). If, however, the response is not determined to be interpretable (Block 406), then a profile associated with the communications address is accessed (Block 410). An alternative presentation of the prompt may be selected, perhaps based on the CC/PP information (Block 412). A communication address may also be selected, perhaps based on the CC/PP information (Block 414). A supplemental prompt may be formatted, based on the alternative presentation and according to the CC/PP information (Block 416). The supplemental response is then sent that presents the alternative presentation of the prompt (Block 418).

Figure 15:
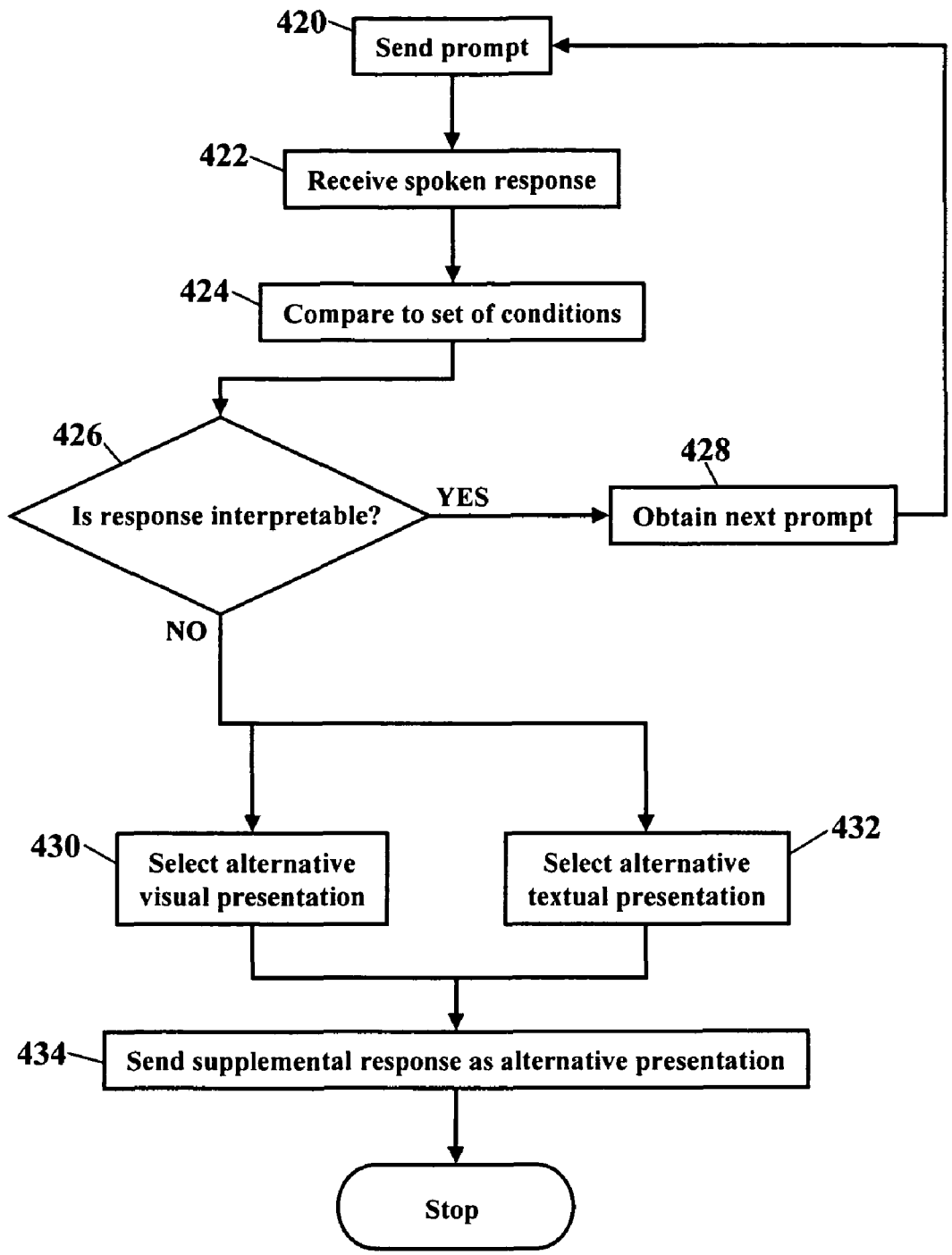

FIG. 15 is another flowchart illustrating a method of processing responses in a prompting system, according to more exemplary embodiments. Here a prompt is sent (Block 420) and a spoken response is received (Block 422). The response is compared to a set of conditions for interpreting the response (Block 424). If the response is determined to be interpretable (Block 426), then a next prompt is prepared (Block 428) and sent (Block 420). If, however, the response is not determined to be interpretable (Block 426), then an alternative visual (Block 430) and/or textual (Block 432) presentation is selected. A supplemental prompt is then sent (Block 434), and the supplemental prompt presents the visual and/or textual presentation.

Figure 16:
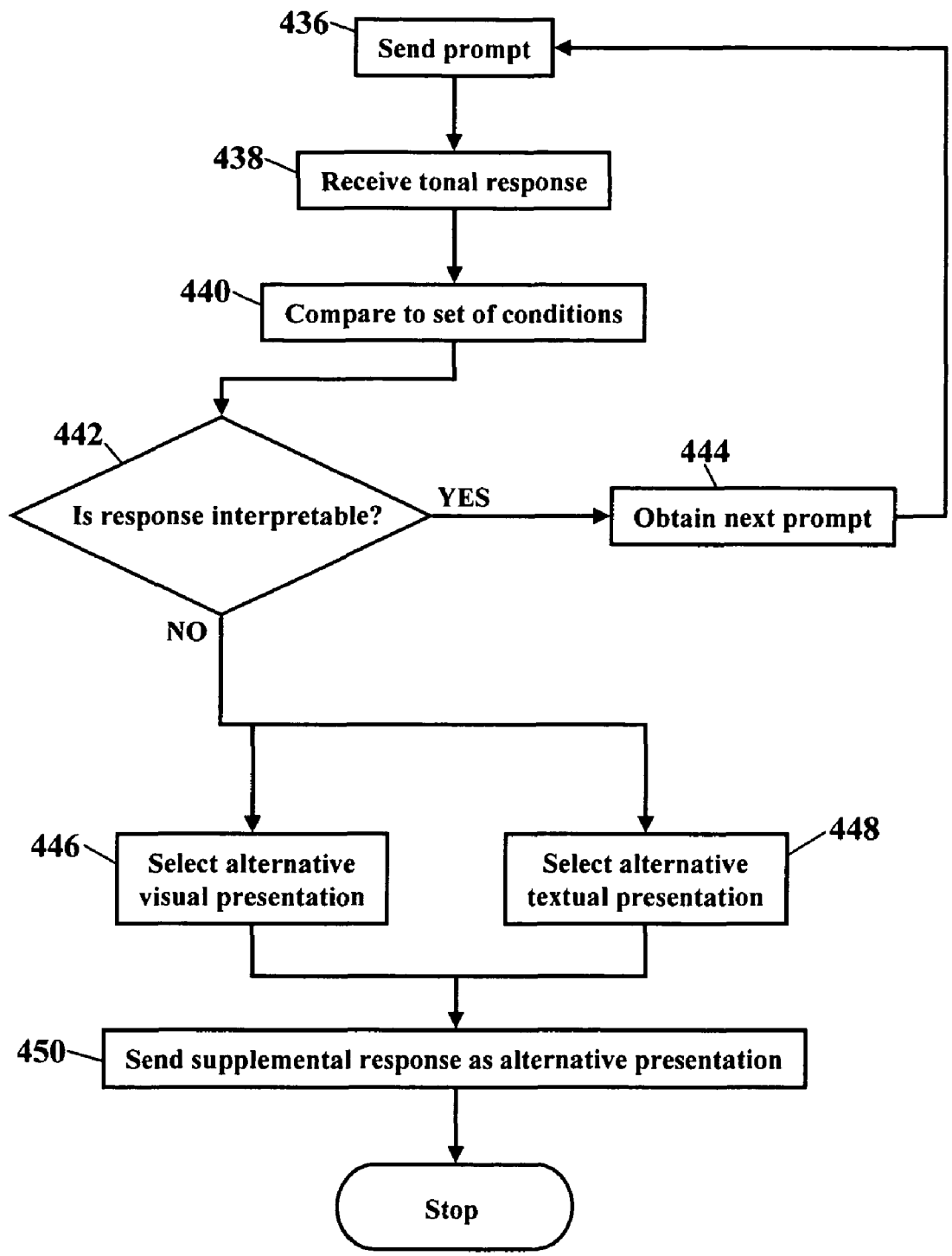

FIG. 16 is another flowchart illustrating a method of processing responses in a prompting system, according to yet more exemplary embodiments. Here a prompt is sent (Block 436) and a tonal response is received (Block 438). The response is compared to a set of conditions for interpreting the response (Block 440). If the response is determined to be interpretable (Block 442), then a next prompt is prepared (Block 444) and sent (Block 436). If, however, the response is not determined to be interpretable (Block 442), then an alternative visual (Block 446) and/or textual (Block 448) presentation is selected. A supplemental prompt is then sent (Block 450), and the supplemental prompt presents the visual and/or textual presentation.

Figure 17:
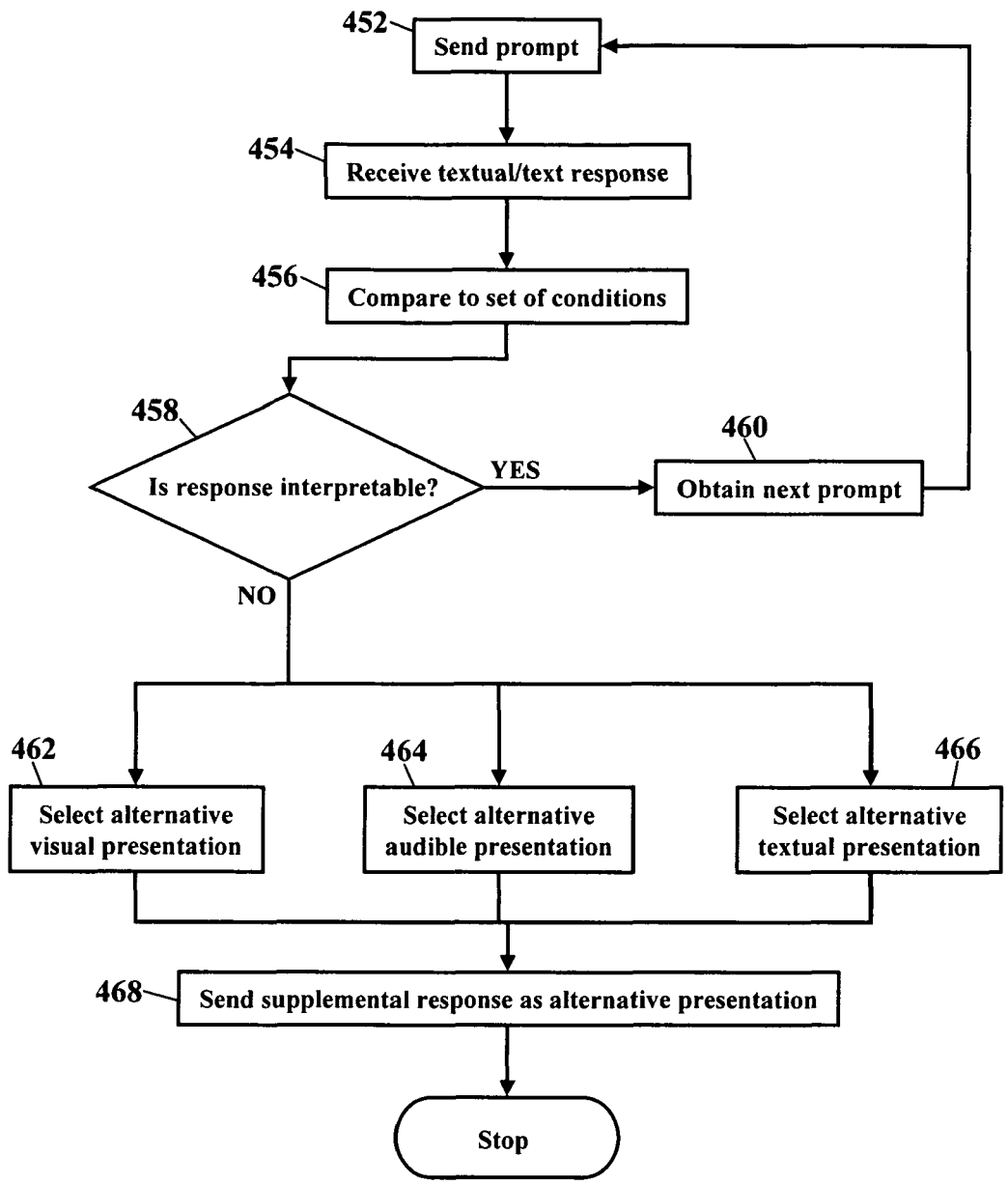

FIG. 17 is another flowchart illustrating a method of processing responses in a prompting system, according to still more exemplary embodiments. Here a prompt is sent (Block 452) and a textual or text-based response is received (Block 454). The response is compared to a set of conditions for interpreting the response (Block 456). If the response is determined to be interpretable (Block 458), then a next prompt is obtained (Block 460) and sent (Block 452). If, however, the response is not determined to be interpretable (Block 458), then an alternative visual (Block 462), audible (Block 464), and/or textual (Block 466) presentation is selected. A supplemental prompt is then sent (Block 468), and the supplemental prompt presents the visual, audible, and/or textual presentation.

The prompting application (shown as reference numeral 22 in the FIGS. 1-5 and 10-17) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-subscribers, licensees, and assignees. These types of computer-readable media, and other types not mention here but considered within the scope of the exemplary embodiments, allow the prompting application to be easily disseminated. A computer program product comprises the prompting application stored on the computer-readable medium. The prompting application comprises computer-readable instructions/code for processing responses.

The prompting application may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method for processing responses in a prompting system, comprising:
    receiving a response from a communications address to a prompt;
    comparing the response to a set of conditions for interpreting the response;
    accessing a database of profiles when the response is uninterpretable;
    retrieving a profile associated with the communications address;
    accessing a table stored in memory that associates alternative presentations to alternative communications addresses;
    retrieving an alternative communications address from the table that is associated with an alternative presentation;
    reformatting the prompt into the alternative presentation retrieved from the table; and
    sending a supplemental prompt to the alternative communications address that presents the alternative presentation of the prompt.

2. The method according to claim 1, wherein receiving the response comprises receiving a spoken response, and wherein sending the supplemental prompt comprises sending at least one of a visual prompt and a textual prompt.

3. The method according to claim 1, wherein receiving the response comprises receiving a tonal response, and wherein sending the supplemental prompt comprises sending at least one of a visual prompt and a textual prompt.

4. The method according to claim 1, further comprising sending a text message as the supplemental prompt.

5. The method according to claim 1, further comprising accessing Composite Capabilities/Preference Profiles (CC/PP) information associated with the alternative communications address.

6. The method according to claim 5, further comprising forming the supplemental response into the alternative presentation according to the Capabilities/Preference Profiles (CC/PP) information.

7. A system, comprising:
    a processor executing code stored in memory that causes the processor to:
    receive a spoken response from a communications address to a prompt;
    compare the spoken response to a set of conditions for interpreting the spoken response;
    access a database of profiles when the spoken response is uninterpretable;
    retrieve a profile associated with the communications address;
    access a table that associates alternative presentations to alternative communications addresses;
    retrieve an alternative communications address from the table that is associated with an alternative textual presentation;
    reformat the prompt into a text message according to the alternative textual presentation; and
    send the text message to the alternative communications address as a supplemental prompt.

8. The system according to claim 7, wherein the code further causes the processor to receive a response to the text message.

9. The system according to claim 7, wherein the code further causes the processor to sequentially send supplemental prompts to each alternative communications address in the table.

10. The system according to claim 7, wherein the code further causes the processor to randomly send supplemental prompts to the alternative communications addresses in the table.

11. The system according to claim 7, wherein the code further causes the processor to retrieve Composite Capabilities/Preference Profiles (CC/PP) information from the profile.

12. The system according to claim 11, wherein the code further causes the processor to form the supplemental response into the alternative presentation according to the Capabilities/Preference Profiles (CC/PP) information.

13. A computer readable medium storing computer code for performing a method, the method comprising:
    receiving a response from a communications address to a prompt;
    comparing the response to a set of conditions for interpreting the response;

accessing a database of profiles when the response is uninterpretable;

retrieving a profile associated with the communications address;

accessing a table that associates alternative presentations to alternative communications addresses;

selecting a prioritized alternative presentation from the table;

retrieving an alternative communications address from the table that is associated with the prioritized alternative presentation;

reformatting the prompt into the prioritized alternative presentation; and sending a supplemental prompt to the alternative communications address that presents the prioritized alternative presentation of the prompt.

14. The computer readable medium according to claim 13, further comprising computer code for receiving a spoken response, and further comprising computer code for sending the supplemental prompt comprising at least one of a visual prompt and a textual prompt.

15. The computer readable medium according to claim 13, further comprising computer code for receiving a tonal response, and further comprising computer code for sending the supplemental prompt comprising at least one of a visual prompt and a textual prompt.

16. The computer readable medium according to claim 13, further comprising computer code for receiving a spoken response and for sending a text message as the supplemental prompt.

17. The computer readable medium according to claim 13, further comprising computer code for i) retrieving Composite Capabilities/Preference Profiles (CC/PP) information from the profile and for ii) forming the supplemental response into the alternative presentation according to the Capabilities/Preference Profiles (CC/PP) information.

* * * * *